United States Patent
Han et al.

(10) Patent No.: US 12,278,376 B2
(45) Date of Patent: Apr. 15, 2025

(54) METHOD OF PREPARING POSITIVE ELECTRODE ACTIVE MATERIAL FOR LITHIUM SECONDARY BATTERY AND POSITIVE ELECTRODE ACTIVE MATERIAL PREPARED BY THE SAME

(71) Applicant: LG Energy Solution, Ltd., Seoul (KR)

(72) Inventors: Jung Min Han, Daejeon (KR); Gi Beom Han, Daejeon (KR); Sang Wook Lee, Daejeon (KR); Hak Yoon Kim, Daejeon (KR); So Ra Baek, Daejeon (KR); Wang Mo Jung, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 473 days.

(21) Appl. No.: 17/775,694

(22) PCT Filed: Dec. 3, 2020

(86) PCT No.: PCT/KR2020/017569
§ 371 (c)(1),
(2) Date: May 10, 2022

(87) PCT Pub. No.: WO2021/112596
PCT Pub. Date: Jun. 10, 2021

(65) Prior Publication Data
US 2022/0407077 A1    Dec. 22, 2022

(30) Foreign Application Priority Data

Dec. 3, 2019 (KR) .................... 10-2019-0159310

(51) Int. Cl.
| | | |
|---|---|---|
| H01M 4/62 | (2006.01) | |
| C01G 53/50 | (2025.01) | |
| H01M 4/04 | (2006.01) | |
| H01M 4/505 | (2010.01) | |
| H01M 4/525 | (2010.01) | |
| H01M 10/0525 | (2010.01) | |
| H01M 4/02 | (2006.01) | |

(52) U.S. Cl.
CPC ............ *H01M 4/628* (2013.01); *C01G 53/50* (2013.01); *H01M 4/0471* (2013.01); *H01M 4/505* (2013.01); *H01M 4/525* (2013.01); *H01M 10/0525* (2013.01); *C01P 2004/03* (2013.01); *C01P 2004/80* (2013.01); *C01P 2006/40* (2013.01); *H01M 2004/021* (2013.01); *H01M 2004/028* (2013.01)

(58) Field of Classification Search
None
See application file for complete search history.

(56) References Cited

U.S. PATENT DOCUMENTS

| | | |
|---|---|---|
| 2014/0339465 A1 | 11/2014 | Okamoto |
| 2017/0207455 A1 | 7/2017 | Watanabe et al. |
| 2018/0287201 A1 | 10/2018 | Okuda |
| 2019/0300382 A1 | 10/2019 | Kim et al. |
| 2019/0334170 A1 | 10/2019 | Takamori et al. |
| 2020/0119342 A1 | 4/2020 | Watanabe et al. |
| 2020/0185708 A1 | 6/2020 | Watanabe et al. |
| 2020/0212442 A1 | 7/2020 | Watanabe et al. |
| 2021/0083285 A1 | 3/2021 | Sommer et al. |

FOREIGN PATENT DOCUMENTS

| | | |
|---|---|---|
| CN | 109071266 A | 12/2018 |
| JP | 2000040505 A | 2/2000 |
| JP | 2003017054 A | 1/2003 |
| JP | 5738563 B2 | 6/2015 |
| JP | 2018-014322 A | 1/2018 |
| JP | 6292739 B2 | 3/2018 |
| JP | 2018172255 A | 11/2018 |
| KR | 20090012201 A | 2/2009 |
| KR | 20180077026 A | 7/2018 |
| KR | 101886514 B1 | 8/2018 |
| KR | 20180112700 A | 10/2018 |
| KR | 20180121484 A | 11/2018 |
| KR | 20190093547 A | 8/2019 |
| KR | 20190095927 A | 8/2019 |
| WO | 2019012497 A1 | 1/2019 |
| WO | 2019154702 A1 | 8/2019 |

OTHER PUBLICATIONS

Huang. B. et al., "A Simple Method for the Complete Performance Recovery of Degraded Ni-rich LiNi0.70Co0.15Mn0.15O2 Cathode via Surface Reconstruction" Applied Materials & Interfaces, Mar. 2019, pp. 14076-14084, vol. 11, Issue No. 15.
Extended European Search Report including Written Opinion for Application No. 20896334.8 dated Nov. 28, 2022, pp. 1-9.
International Search Report for PCT/KR2020/017569 dated Mar. 12, 2021. 3 pgs.

*Primary Examiner* — Carlos Barcena
(74) *Attorney, Agent, or Firm* — Lerner David LLP

(57) ABSTRACT

A method of preparing a positive electrode active material includes preparing a lithium transition metal oxide containing nickel in an amount of 60 mol % or more based on a total number of moles of metals excluding lithium, impregnating the lithium transition metal oxide with 300 ppm to 1,000 ppm of moisture based on 100 parts by weight of the lithium transition metal oxide, and performing a heat treatment on the lithium transition metal oxide impregnated with the moisture, wherein a lithium by-product present on a surface of the lithium transition metal oxide and the moisture react to form a passivation layer on the surface of the lithium transition metal oxide. A positive electrode active material prepared by the above-described preparation method, and a positive electrode and a lithium secondary battery which include the positive electrode active material are also provided.

12 Claims, 4 Drawing Sheets

METHOD OF PREPARING POSITIVE ELECTRODE ACTIVE MATERIAL FOR LITHIUM SECONDARY BATTERY AND POSITIVE ELECTRODE ACTIVE MATERIAL PREPARED BY THE SAME

CROSS-REFERENCE TO RELATED APPLICATIONS

This application is a national phase entry under 35 U.S.C. § 371 of International Application No. PCT/KR2020/017569, filed on Dec. 3, 2020, which claims priority from Korean Patent Application No. 10-2019-0159310, filed on Dec. 3, 2019, the disclosures of which are incorporated by reference herein.

TECHNICAL FIELD

The present invention relates to a method of preparing a positive electrode active material for a lithium secondary battery, a positive electrode active material prepared by the method, and a positive electrode and a lithium secondary battery which include the positive electrode active material.

BACKGROUND ART

Demand for secondary batteries as an energy source has been significantly increased as technology development and demand with respect to mobile devices have increased. Among these secondary batteries, lithium secondary batteries having high energy density, high voltage, long cycle life, and low self-discharging rate have been commercialized and widely used.

Lithium transition metal composite oxides have been used as a positive electrode active material of the lithium secondary battery, and, among these oxides, a lithium cobalt composite metal oxide, such as $LiCoO_2$, having a high operating voltage and excellent capacity characteristics has been mainly used. However, the $LiCoO_2$ has very poor thermal properties due to an unstable crystal structure caused by delithiation. Also, since the $LiCoO_2$ is expensive, there is a limitation in using a large amount of the $LiCoO_2$ as a power source for applications such as electric vehicles.

Lithium manganese composite metal oxides ($LiMnO_2$ or $LiMn_2O_4$), lithium iron phosphate compounds ($LiFePO_4$, etc.), or lithium nickel composite metal oxides ($LiNiO_2$, etc.) have been developed as materials for replacing the $LiCoO_2$. Among these materials, research and development of the lithium nickel composite metal oxides, in which a large capacity battery may be easily achieved due to a high reversible capacity of about 200 mAh/g, have been more actively conducted. However, the $LiNiO_2$ has limitations in that the $LiNiO_2$ has poorer thermal stability than the $LiCoO_2$ and, when an internal short circuit occurs in a charged state due to an external pressure, the positive electrode active material itself is decomposed to cause rupture and ignition of the battery. Accordingly, as a method to improve low thermal stability while maintaining the excellent reversible capacity of the $LiNiO_2$, a lithium transition metal oxide, in which a portion of nickel (Ni) is substituted with cobalt (Co), manganese (Mn), or aluminum (Al), has been developed.

However, in a case in which the lithium transition metal oxide contains a large amount of nickel of 60 mol % or more in order to increase capacity characteristics, there has been a limitation in that a large amount of lithium by-product, such as LiOH and/or $Li_2CO_3$, is formed on a surface of the lithium transition metal oxide due to the tendency of the nickel in the lithium transition metal oxide containing the large amount of the nickel to remain as $Ni^{2+}$. In addition, in a case in which the lithium transition metal oxide is used as the positive electrode active material, the lithium by-product formed on the surface reacts with an electrolyte solution injected into the lithium secondary battery to cause gas generation and a swelling phenomenon of the battery, and, accordingly, there has been a limitation in that stability of the battery is reduced.

Also, in the case that the above-described lithium transition metal oxide is used, since a heat generation reaction occurs at an interface between a positive electrode and the electrolyte solution during overcharge and a time of heat generation may be accelerated as the amount of the nickel in the lithium transition metal oxide is increased, there has been a limitation in that thermal stability is reduced.

Thus, there is a need to develop a method capable of improving the thermal stability while having high capacity.

DISCLOSURE OF THE INVENTION

Technical Problem

An aspect of the present invention provides a method of preparing a positive electrode active material which may minimize a side reaction between the positive electrode active material and an electrolyte solution by forming a passivation layer on a surface of the positive electrode active material by moisture impregnation.

Another aspect of the present invention provides a positive electrode active material in which stability is improved by suppressing a side reaction between a lithium transition metal oxide and the electrolyte solution.

Another aspect of the present invention provides a positive electrode including the positive electrode active material.

Another aspect of the present invention provides a lithium secondary battery including the positive electrode.

Technical Solution

According to an aspect of the present invention, there is provided a method of preparing a positive electrode active material which includes: preparing a lithium transition metal oxide containing nickel in an amount of 60 mol % or more based on a total number of moles of metals excluding lithium; impregnating the lithium transition metal oxide with 300 ppm to 1,000 ppm of moisture based on 100 parts by weight of the lithium transition metal oxide; and performing a heat treatment on the lithium transition metal oxide impregnated with the moisture, wherein a lithium by-product present on a surface of the lithium transition metal oxide and the moisture react to form a passivation layer on the surface of the lithium transition metal oxide.

According to another aspect of the present invention, there is provided a positive electrode active material which includes a lithium transition metal oxide containing nickel in an amount of 60 mol % or more based on a total number of moles of metals excluding lithium; and a passivation layer which is disposed on a surface of the lithium transition metal oxide, has a rock salt structure, and includes lithium carbonate, wherein the passivation layer is formed by reacting a lithium by-product present on the surface of the lithium transition metal oxide and moisture impregnated in the surface of the lithium transition metal oxide.

According to another aspect of the present invention, there is provided a positive electrode for a lithium secondary battery which includes the positive electrode active material.

According to another aspect of the present invention, there is provided a lithium secondary battery including the positive electrode for a lithium secondary battery.

Advantageous Effects

According to an aspect of the present invention, since a surface of a lithium transition metal oxide containing a large amount of nickel is impregnated with moisture, the moisture and a lithium by-product present on the surface of the lithium transition metal oxide may react to form a passivation layer. Since a reaction between a positive electrode active material and an electrolyte solution is easily suppressed by the above-described passivation layer, thermal stability may be improved when the lithium transition metal oxide is used in a battery.

MODE FOR CARRYING OUT THE INVENTION

Figure 1:
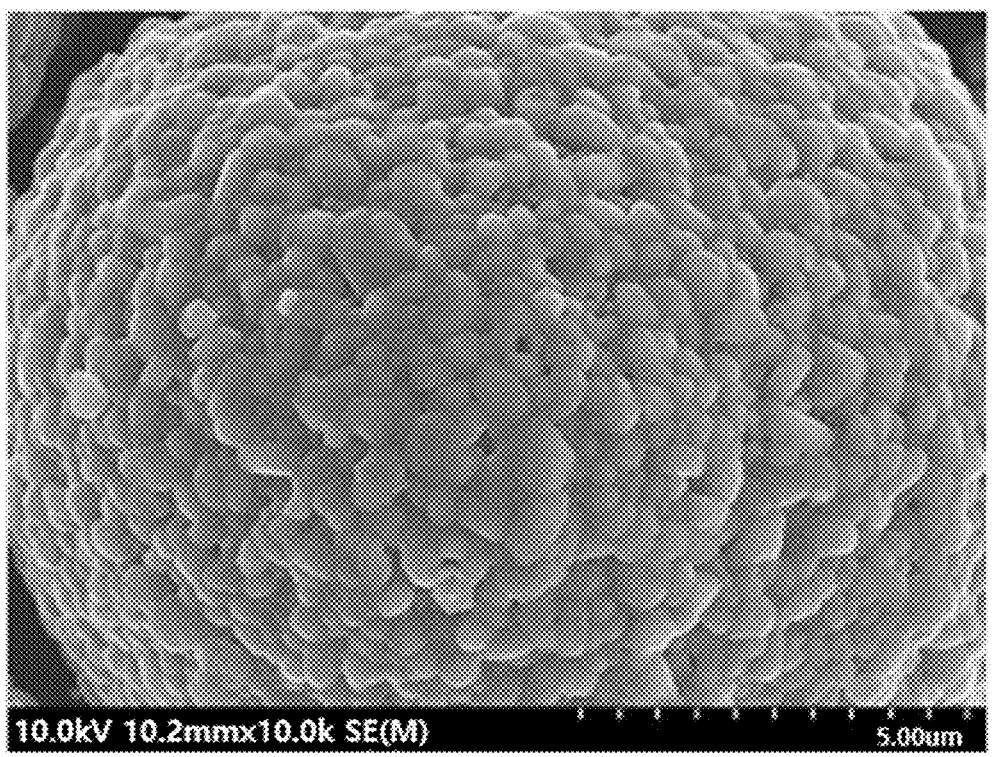
FIG. 1 is a scanning electron microscope (SEM) image of a surface of a positive electrode active material prepared in Example 1.

Hereinafter, the present invention will be described in more detail.

In the present invention, the expression "rock salt structure" denotes an Fm-3m structure in the same form as NiO which is formed by reacting unstable $Ni^{4+}$ on a surface of a positive electrode active material with an electrolyte solution when degradation of the surface of the active material occurs.

Method of Preparing Positive Electrode Active Material

The present inventors have found that a passivation layer capable of suppressing a side reaction between a lithium transition metal oxide and an electrolyte solution may be formed by a reaction of moisture with a lithium by-product present on a surface of the lithium transition metal oxide containing a large amount of nickel by impregnating the surface of the lithium transition metal oxide containing a large amount of nickel with the moisture.

Specifically, in order to prepare a positive electrode active material according to an embodiment of the present invention, a step of preparing a lithium transition metal oxide containing nickel in an amount of 60 mol % or more based on a total number of moles of metals excluding lithium; a step of impregnating the lithium transition metal oxide with 300 ppm to 1,000 ppm of moisture based on 100 parts by weight of the lithium transition metal oxide; and a step of performing a heat treatment on the lithium transition metal oxide impregnated with the moisture may be included, wherein a lithium by-product present on a surface of the lithium transition metal oxide and the moisture react to form a passivation layer on the surface of the lithium transition metal oxide.

Hereinafter, a method of preparing the positive electrode active material according to the present invention will be described in more detail.

First, a lithium transition metal oxide containing nickel in an amount of 60 mol % or more based on a total number of moles of metals excluding lithium is prepared (first step).

A lithium transition metal oxide containing nickel in an amount of 60 mol % or more based on a total number of moles of metals excluding lithium among commercially available lithium transition metal oxides may be purchased and used as the lithium transition metal oxide, or the lithium transition metal oxide may be prepared according to a method of preparing a lithium transition metal oxide which is well known in the art.

The lithium transition metal oxide may contain nickel in an amount of 65 mol % or more based on the total number of moles of metals excluding lithium in order to exhibit high capacity characteristics, and may be represented by the following Formula 1.

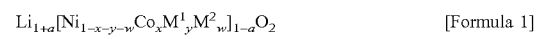

$Li_{1+a}[Ni_{1-x-y-w}Co_xM^1_yM^2_w]_{1-a}O_2$     [Formula 1]

In Formula 1, $M^1$ includes at least one of manganese (Mn) or aluminum (Al), $M^2$ includes at least one of barium (Ba), calcium (Ca), zirconium (Zr), titanium (Ti), magnesium (Mg), tantalum (Ta), niobium (Nb), or molybdenum (Mo), and $0 \leq a \leq 0.5$, $0 \leq x \leq 0.4$, $0 \leq y \leq 0.4$, and $0 \leq w \leq 0.1$.

Also, the positive electrode active material may selectively further include doping element $M^2$, if necessary, and the doping element $M^2$ may include at least one metallic element of Ba, Ca, Zr, Ti, Mg, Ta, Nb, or Mo. In a case in which the positive electrode active material further includes the doping element $M^2$, since structural stability of the positive electrode active material may be improved, life characteristics of a battery using the positive electrode active material may be further improved.

In a case in which the above-described lithium transition metal oxide contains nickel in an amount of 60 mol % or more based on the total number of moles of metals excluding lithium, a positive electrode active material having high capacity characteristics may be provided, but there is a disadvantage in that a large amount of lithium by-product, such as $Li_2O$, LiOH, and/or $Li_2CO_3$, is present on the surface of the lithium transition metal oxide due to the tendency of the nickel in the lithium transition metal oxide to remain as $Ni^{2+}$ as the amount of the nickel is increased.

In addition, since the above-described lithium by-products are locally aggregated on the surface of the lithium transition metal oxide, an increase in specific surface area of the lithium transition metal oxide may increase a reaction area with the electrolyte solution when the lithium transition metal oxide is used in the battery, and thus, a side reaction with the electrolyte solution increases and it may further cause a problem of reducing surface stability, for example, an increase in an amount of high-temperature gas generated.

Thus, in an embodiment of the present invention, since the lithium transition metal oxide having the lithium by-product present on the surface thereof is further impregnated with moisture, the moisture and the lithium by-product present on the surface of the lithium transition metal oxide may react to form a uniform passivation layer on the surface of the lithium transition metal oxide.

Hereinafter, the formation of the passivation layer by moisture impregnation will be described in more detail.

Specifically, according to the present invention, 100 parts by weight of the lithium transition metal oxide is impregnated with 300 ppm to 1,000 ppm of moisture (second step).

Preferably, the impregnating with moisture may be a step of impregnating the lithium transition metal oxide with 300 ppm to 500 ppm of moisture, for example, 300 ppm to 450 ppm of moisture based on 100 parts by weight of the lithium transition metal oxide. In a case in which 100 parts by weight of the lithium transition metal oxide is impregnated with the moisture in an amount within the range of the present invention, the moisture and the lithium by-product present on the surface of the lithium transition metal oxide may react to form a passivation layer on the surface of the lithium transition metal oxide, and the passivation layer may include lithium carbonate.

The lithium by-product present on the surface of the lithium transition metal oxide may include at least one of $Li_2O$, $LiOH$, or $Li_2CO_3$.

For example, in the case that the surface of the lithium transition metal oxide is impregnated with the moisture in an amount within the range of the present invention, the lithium by-product present on the surface of the lithium transition metal oxide may constitute a passivation layer by being uniformly distributed on the surface of the lithium transition metal oxide by the moisture.

Also, the side reaction between the lithium transition metal oxide and the electrolyte solution is suppressed when the positive electrode active material having the passivation layer formed thereon is used in the battery, and, accordingly, generation of leakage current and thermal stability may be improved.

In a case in which the amount of the moisture impregnated is greater than 1,000 ppm, since the passivation layer on the surface is excessively formed as the amount of the moisture impregnated is excessively large, it may act as a surface resistance layer to degrade resistance characteristics and rate capability may also be reduced due to a reduction in energy density. In contrast, in a case in which the amount of the moisture impregnated is less than 300 ppm, since the amount of the moisture capable of reacting with the lithium by-product present on the surface of the lithium transition metal oxide is insignificant, a passivation layer with a uniform thickness may not be formed on the surface.

Finally, the lithium transition metal oxide impregnated with the moisture is heat-treated (third step).

Since the lithium by-product present on the surface of the lithium transition metal oxide and the moisture impregnated in the second step react by the performing of the heat treatment, a passivation layer may be firmly formed on the surface of the lithium transition metal oxide.

For example, the heat treatment may be performed in a temperature range of 500° C. to 900° C. for 3 hours to 15 hours, for example, 700° C. to 850° C. for 5 hours to 10 hours. In a case in which the heat treatment temperature and time respectively satisfy the above-described ranges, active oxygen may be generated due to the property of the transition metal present on the surface of the lithium transition metal oxide in which the transition metal is reduced from trivalent to divalent, and, accordingly, the surface of the positive electrode active material may be changed from a layered structure to a rock salt structure to more firmly form the passivation layer.

In addition, since the moisture present on the surface is partially volatilized after the heat treatment, the amount of the moisture present in the positive electrode active material may be reduced to an amount immediately after the preparing of the lithium transition metal oxide in the first step, for example, about 50 ppm to about 250 ppm. That is, since the amount of the moisture is reduced after the formation of the robust passivation layer on the surface, a gelation phenomenon of an electrode may be suppressed when the electrode is prepared by using the positive electrode active material.

Positive Electrode Active Material

Also, the present invention provides a positive electrode active material which is prepared by the above-described method and includes a lithium transition metal oxide containing nickel in an amount of 60 mol % or more based on a total number of moles of metals excluding lithium; and a passivation layer which is disposed on a surface of the lithium transition metal oxide, has a rock salt structure, and includes lithium carbonate, wherein the passivation layer is formed by reacting a lithium by-product present on the surface of the lithium transition metal oxide and moisture impregnated in the surface.

The passivation layer according to the present invention includes a passivation layer uniformly formed on the surface of the lithium transition metal oxide, and the passivation layer may preferably have a uniform thickness of 5 nm to 30 nm, for example, 10 nm to 20 nm.

Since the passivation layer is uniformly formed on the surface of the lithium transition metal oxide, a direct contact between the lithium transition metal oxide and the electrolyte solution is suppressed when the positive electrode active material is used in a battery, and, as a result, the occurrence of a side reaction may also be suppressed. As a result, thermal stability and the generation of leakage current may be improved when the positive electrode active material is used in the battery.

Furthermore, according to the present invention, since the passivation layer has a rock salt structure, the structure of the passivation layer may become more robust by improving structural stability.

Positive Electrode

Also, the present invention provides a positive electrode for a lithium secondary battery which includes the above-described positive electrode active material.

Specifically, the positive electrode includes a positive electrode collector and a positive electrode active material layer which is disposed on at least one surface of the positive electrode collector and includes the above-described positive electrode active material.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

The positive electrode active material layer may include a conductive agent and a binder in addition to the positive electrode active material.

In this case, the positive electrode active material may be included in an amount of 80 wt % to 99 wt %, for example, 85 wt % to 98 wt % based on a total weight of the positive electrode active material layer. When the positive electrode active material is included in an amount within the above range, excellent capacity characteristics may be obtained.

In this case, the conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be typically included in an amount of 1 wt % to 30 wt % based on the total weight of the positive electrode active material layer.

The binder improves the adhesion between positive electrode active material particles and the adhesion between the positive electrode active material and the current collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene polymer (EPDM), a sulfonated EPDM, a styrene-butadiene rubber (SBR), a fluorine rubber, or various copolymers thereof, and any one thereof or a mixture of two or more thereof may be used. The binder may be included in an amount of 1 wt % to 30 wt % based on the total weight of the positive electrode active material layer.

The positive electrode may be prepared according to a typical method of preparing a positive electrode except that the above-described positive electrode active material is used. Specifically, a composition for forming a positive electrode active material layer, which is prepared by dissolving or dispersing the positive electrode active material as well as selectively the binder and the conductive agent in a solvent, is coated on the positive electrode collector, and the positive electrode may then be prepared by drying and rolling the coated positive electrode collector. In this case, types and amounts of the positive electrode active material, the binder, and the conductive are the same as those previously described.

The solvent may be a solvent normally used in the art. The solvent may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the solvent may dissolve or disperse the positive electrode active material, the conductive agent, and the binder in consideration of a coating thickness of a slurry and manufacturing yield, and may allow to have a viscosity that may provide excellent thickness uniformity during the subsequent coating for the preparation of the positive electrode.

Also, as another method, the positive electrode may be prepared by casting the composition for forming a positive electrode active material layer on a separate support and then laminating a film separated from the support on the positive electrode collector.

Lithium Secondary Battery

Furthermore, in the present invention, an electrochemical device including the positive electrode may be prepared. The electrochemical device may specifically be a battery or a capacitor, and, for example, may be a lithium secondary battery.

The lithium secondary battery specifically includes a positive electrode, a negative electrode disposed to face the positive electrode, a separator disposed between the positive electrode and the negative electrode, and an electrolyte, wherein, since the positive electrode is the same as described above, detailed descriptions thereof will be omitted, and the remaining configurations will be only described in detail below.

Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 μm to 500 μm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to the negative electrode active material.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_\beta$ ($0<\beta<^2$), $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

The negative electrode active material may be included in an amount of 80 parts by weight to 99 parts by weight based on 100 parts by weight of a total weight of the negative electrode active material layer.

The binder is a component that assists in the binding between the conductive agent, the active material, and the current collector, wherein the binder is typically added in an amount of 0.1 part by weight to 10 parts by weight based on 100 parts by weight of the total weight of the negative electrode active material layer. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, polytetrafluoroethylene, polyethylene, polypropylene, an ethylene-propylene-diene polymer (EPDM), a sulfonated-EPDM, a styrene-butadiene rubber, a nitrile-butadiene rubber, a fluorine rubber, and various copolymers thereof.

The conductive agent is a component for further improving conductivity of the negative electrode active material, wherein the conductive agent may be added in an amount of 10 parts by weight or less, for example, 5 parts by weight or less based on 100 parts by weight of the total weight of the negative electrode active material layer. The conductive agent is not particularly limited as long as it has conductivity without causing adverse chemical changes in the battery, and, for example, a conductive material such as: graphite such as natural graphite or artificial graphite; carbon black such as acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used.

For example, the negative electrode active material layer may be prepared by coating a negative electrode material mixture, which is prepared by dissolving or dispersing selectively the binder and the conductive agent as well as the negative electrode active material in a solvent, on the negative electrode collector and drying the coated negative electrode collector, or may be prepared by casting the negative electrode material mixture on a separate support and then laminating a film separated from the support on the negative electrode collector.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphorictriamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 part by weight to 5 parts by weight based on 100 parts by weight of a total weight of the electrolyte.

As described above, since the lithium secondary battery including the positive electrode active material according to the present invention stably exhibits excellent discharge capacity, output characteristics, and life characteristics, the lithium secondary battery is suitable for portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

A shape of the lithium secondary battery of the present invention is not particularly limited, but a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

100 parts by weight of a lithium transition metal oxide represented by $LiNi_{0.65}Co_{0.15}Mn_{0.20}O_2$ was impregnated with 300 ppm of moisture at 23° C. and a relative humidity of 60% for 3 hours using a constant temperature and humidity chamber and then heat-treated at 800° C. for 7 hours to prepare a positive electrode active material on which a 13 nm thick passivation layer was formed.

Example 2

A positive electrode active material was prepared in the same manner as in Example 1 except that 100 parts by weight of the lithium transition metal oxide was impregnated with 450 ppm of moisture for 5 hours to form a 20 nm thick passivation layer.

Comparative Example 1

A lithium transition metal oxide represented by $LiNi_{0.65}Co_{0.15}Mn_{0.20}O_2$ was used as a positive electrode active material.

Comparative Example 2

A positive electrode active material was prepared in the same manner as in Example 1 except that 100 parts by weight of the lithium transition metal oxide was impregnated with 200 ppm of moisture and a heat treatment was not performed.

Comparative Example 3

A positive electrode active material was prepared in the same manner as in Example 1 except that 100 parts by weight of the lithium transition metal oxide was impregnated with 1,000 ppm of moisture and a heat treatment was not performed.

Comparative Example 4

A positive electrode active material was prepared in the same manner as in Example 1 except that 100 parts by weight of the lithium transition metal oxide was impregnated with 1,200 ppm of moisture and a heat treatment was not performed.

Experimental Example 1: Confirmation of Surface Structure of Positive Electrode Active Material In order to confirm a passivation layer present on a surface of each of the positive electrode active materials prepared in Examples 1 and 2 and Comparative Examples 1 to 3, the surface of each positive electrode active material was observed using a scanning electron microscope, and the results thereof are presented in FIGS. 1 to 5, respectively.

Figure 2:
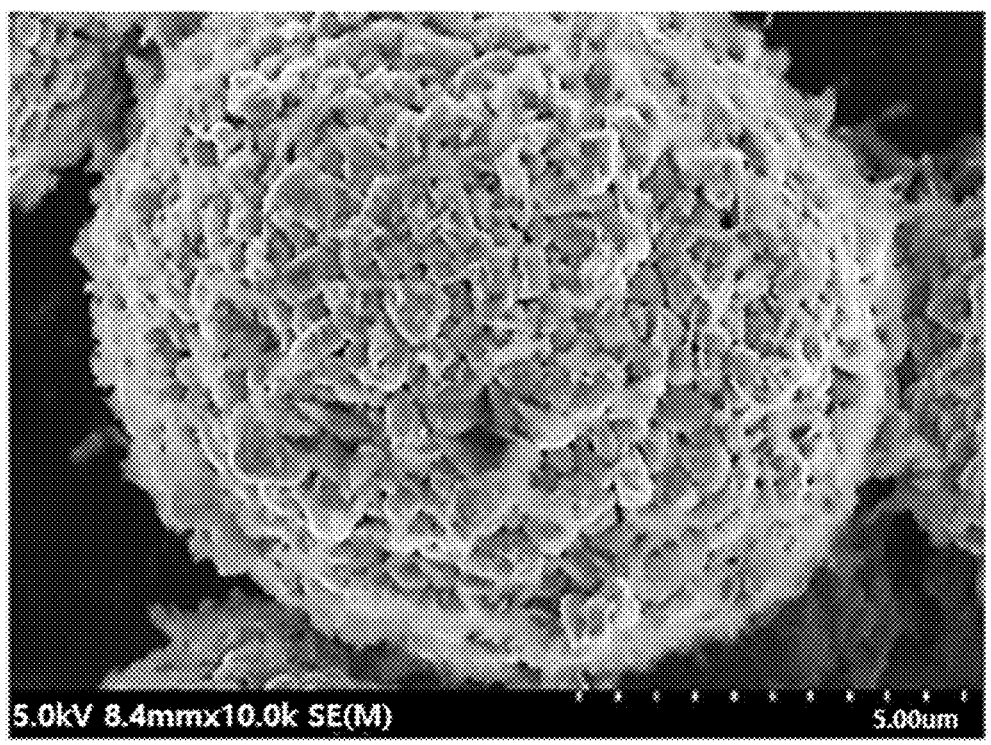
FIG. 2 is an SEM image of a surface of a positive electrode active material prepared in Example 2.
Figure 3:
FIG. 3 is an SEM image of a surface of a positive electrode active material prepared in Comparative Example 1.

Referring to FIGS. 1 and 2, it may be confirmed that the positive electrode active materials prepared in Examples 1 and 2 had an equivalent or similar surface condition in comparison to Comparative Example 1 (FIG. 3) on which a separate passivation layer was not formed.

Figure 4:
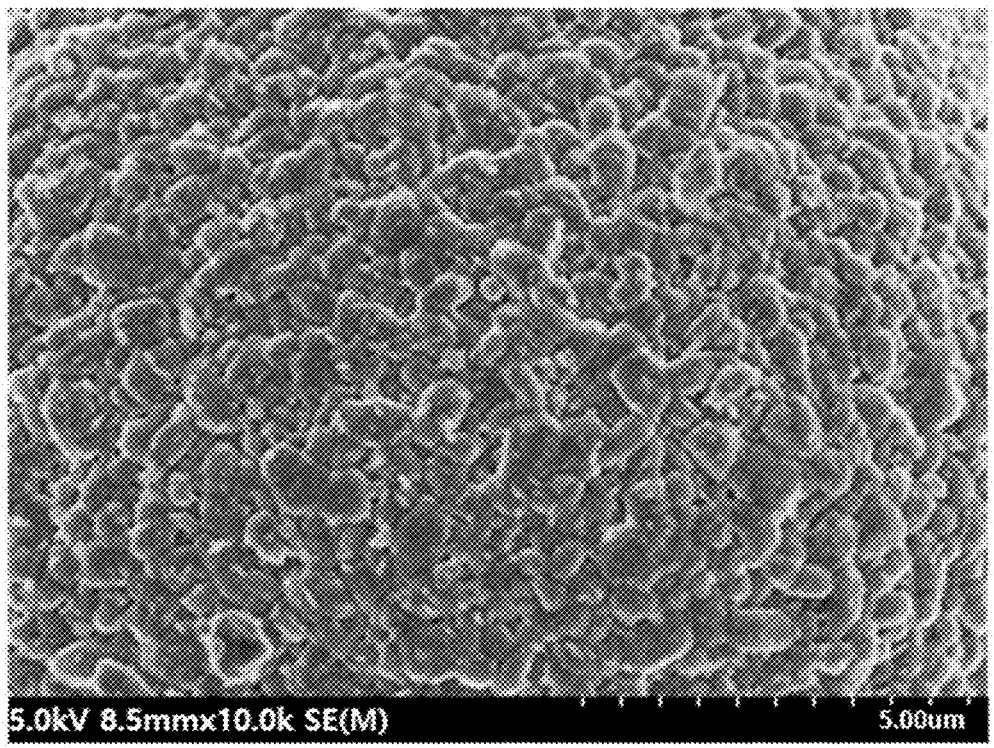
FIG. 4 is an SEM image of a surface of a positive electrode active material prepared in Comparative Example 2.
Figure 5:
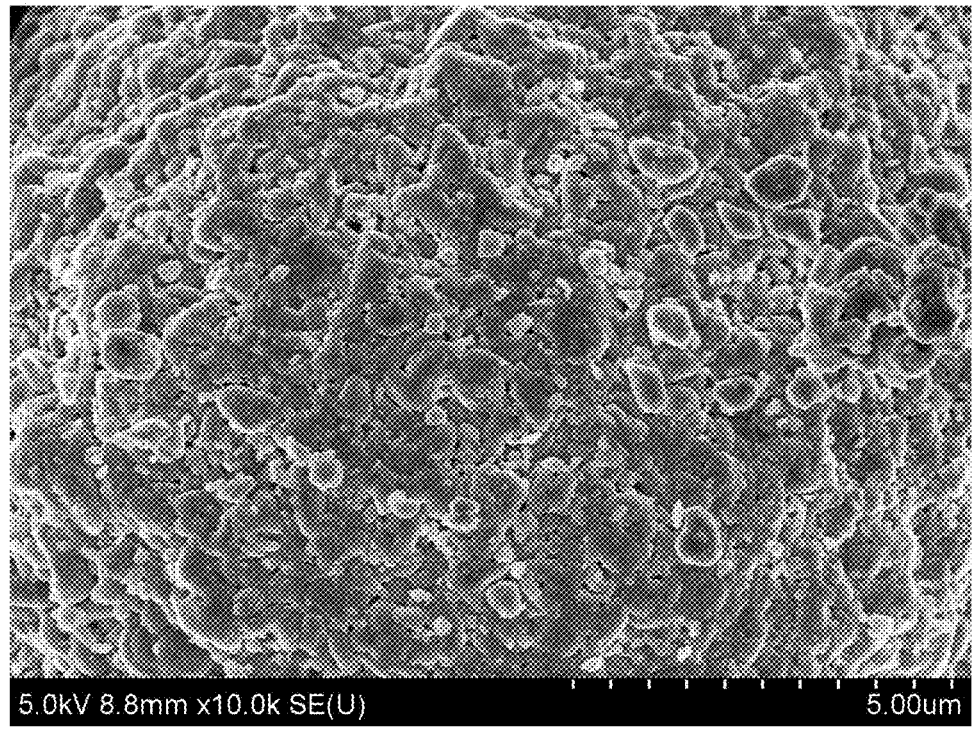
FIG. 5 is an SEM image of a surface of a positive electrode active material prepared in Comparative Example 3.

In contrast, referring to FIGS. 4 and 5, with respect to the positive electrode active materials prepared in Comparative Examples 2 and 3, it may be confirmed that surfaces were not uniform because lithium carbonate was aggregated locally on the surfaces.

Experimental Example 2: DSC Evaluation

In order to evaluate thermal stabilities of the positive electrode active materials prepared in Examples 1 and 2 and Comparative Examples 1 to 4, heat flows were measured using a differential scanning calorimeter (Sensys evo DSC, SETARAM Instrumentation), and the results thereof are presented in FIG. 6 and Table 1 below.

Specifically, each of the positive electrode active materials prepared in Examples 1 and 2 and Comparative Examples 1 to 4 was overcharged to a state of charge (SOC) of 120%, 12 mg of each positive electrode active material was put in a pressure-resistant pan for DSC measurement, and 20 μL of an electrolyte solution was then injected. A temperature range for DSC analysis was set at 150° C. to 350° C., and a heating rate was set at 10° C./min.

An onset temperature in the following Table 1 denotes a temperature at which heat generation starts, and a first peak generation temperature denotes a temperature at which a calorific value is maximum.

The calorific value was calculated by integrating a calorific value in a temperature range of 150° C. to 350° C. when the temperature is increased at a rate of 10° C./min. Specifically, a calorific value per 1 g of the positive electrode active material in Table 1 is a value obtained by dividing a measured calorific value due to a reaction between the positive electrode active material and the electrolyte solution during heating by a weight of the positive electrode active material used in the corresponding experiment.

TABLE 1

|  | Onset temperature (° C.) | First peak generation temperature (° C.) | Calorific value per 1 g of positive electrode active material (J/g) |
|---|---|---|---|
| Example 1 | 220.4 | 232.6 | 948 |
| Example 2 | 217.6 | 226.1 | 895 |
| Comparative Example 1 | 194.2 | 205.1 | 1,400 |
| Comparative Example 2 | 196.1 | 210.7 | 1,204 |
| Comparative Example 3 | 191.0 | 209.0 | 1,716 |
| Comparative Example 4 | 190.0 | 203.6 | 1,802 |

Figure 6:
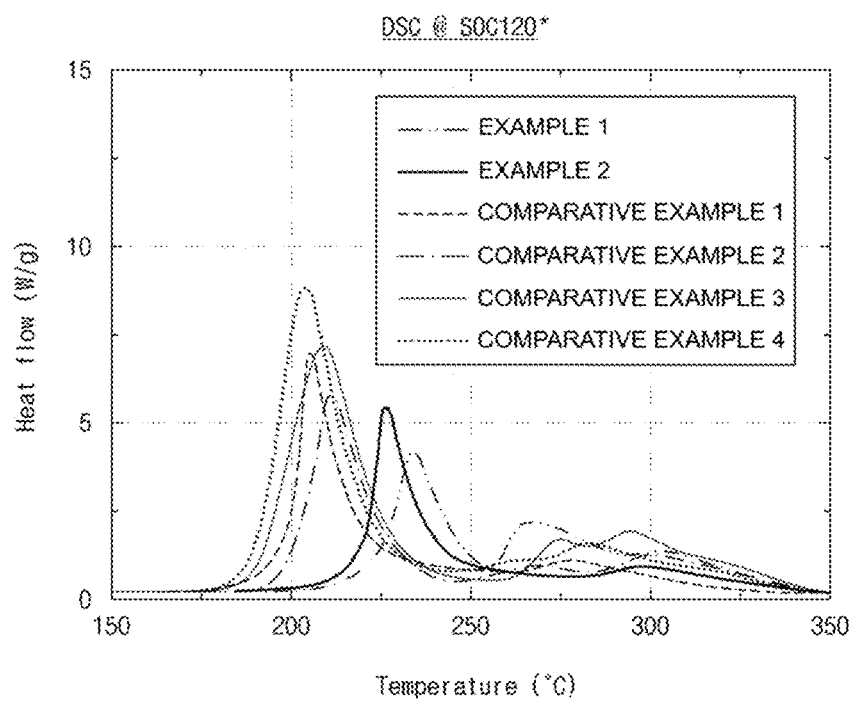
FIG. 6 is a graph illustrating heat flows of positive electrode active materials prepared in the examples and comparative examples.

As illustrated in Table 1 and FIG. 6, it may be confirmed that the positive electrode active materials prepared in Examples 1 and 2 had a higher heat generation onset temperature, exhibited a heat flow peak at a higher temperature, and had a lower peak height than the positive electrode active materials prepared in Comparative Examples 1 to 4. Also, it may be confirmed that calorific values generated during overcharge were also lower than those of Comparative Examples 1 to 4. Accordingly, it may be confirmed that the thermal stabilities of the positive electrode active materials of Examples 1 and 2 were better than those of Comparative Examples 1 to 4.

Experimental Example 3: Continuous Charge Test

Secondary batteries were prepared by using the positive electrode active materials respectively prepared in Examples 1 and 2 and Comparative Examples 1 to 4, and continuous charge characteristics were evaluated for each of the secondary batteries including the positive electrode active materials of Examples 1 and 2 and Comparative Examples 1 to 4.

First, each of the positive electrode active materials prepared in Examples 1 and 2 and Comparative Examples 1 to 4, a carbon black conductive agent, and a polyvinylidene fluoride (PVdF) binder were mixed in an N-methylpyrrolidone(NMP) solvent at a weight ratio of 96.5:1.5:2.0 to prepare a positive electrode slurry. A 20 μm thick aluminum current collector was coated with the positive electrode slurry, dried at 130° C., and then rolled to prepare a positive electrode.

Lithium (Li) metal was used as a negative electrode.

Each lithium secondary battery was prepared by preparing an electrode assembly by disposing a porous polyethylene separator between the positive electrode and negative electrode prepared as described above, disposing the electrode assembly in a battery case, and then injecting an electrolyte solution into the case. In this case, as the electrolyte solution, an electrolyte solution, in which 1.0 M lithium hexafluorophosphate (LiPF$_6$) was dissolved in an organic solvent in which ethylenecarbonate (EC):ethylmethyl carbonate (EMC):diethyl carbonate (DEC) were mixed in a volume ratio of 3:4:3, was injected to prepare the lithium secondary batteries (coin half cells) according to Examples 1 and 2 and Comparative Examples 1 to 4.

Subsequently, a charge profile at 50° C. and 4.7 V of each of the secondary batteries respectively including the above-prepared positive electrode active materials of Examples 1 and 2 and Comparative Examples 1 to 4 was confirmed.

Specifically, each of the secondary batteries respectively including the positive electrode active materials of Examples 1 and 2 and Comparative Examples 1 to 4 was charged at a constant current of 0.2 C to 4.7 V at 50° C. and cut-off charged at 0.05 C continuously for 120 hours, an amount of current generated to maintain a voltage of 4.7 V at 50° C. was measured, and the results thereof are presented in FIG. 7 and Table 2 below. In this case, an average leakage current value calculated in Table 2 was calculated by integrating the current value obtained during continuous charge and then dividing it by 120 hours, leakage current measurement time.

TABLE 2

|  | Average leakage current (mAh/h) |
|---|---|
| Example 1 | 0.034 |
| Example 2 | 0.067 |
| Comparative Example 1 | 0.225 |
| Comparative Example 2 | 0.142 |
| Comparative Example 3 | 0.283 |
| Comparative Example 4 | 0.335 |

Figure 7:
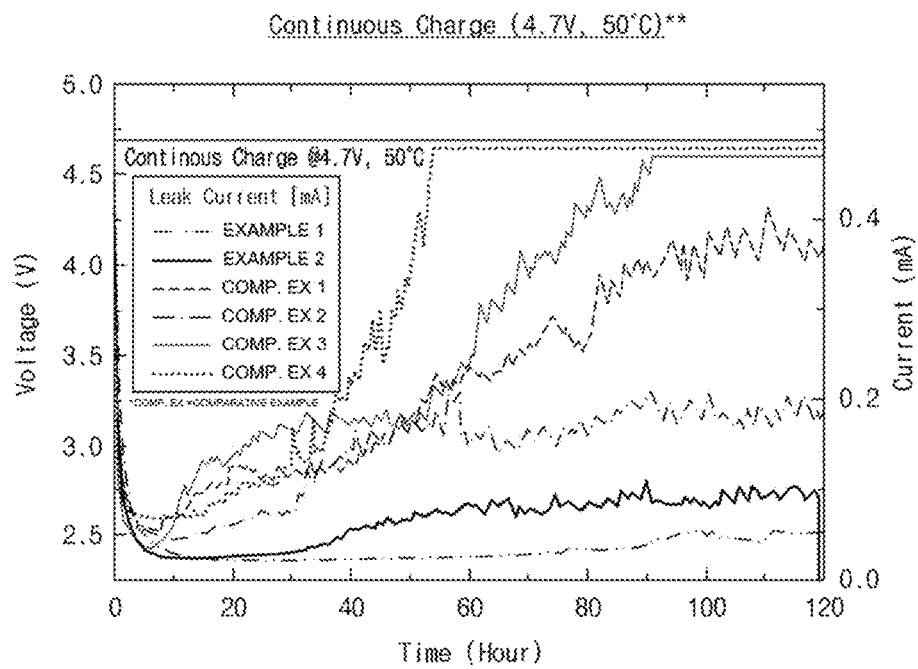
FIG. 7 is a graph illustrating leakage currents during continuous charge of secondary batteries including the positive electrode active materials of the examples and comparative examples.

As illustrated in FIG. 7, with respect to the secondary battery of Example 1, it may be confirmed that a current value generated to maintain a voltage of 4.7 V at a high temperature of 50° C. was lower than those of the secondary batteries of Comparative Examples 1 to 4. With respect to the average leakage current values in Table 2, since more current is required to maintain a voltage of 4.7 V as more side reactions occur at an interface between the positive electrode active material and the electrolyte solution, the larger the leakage current value is, the lower the surface stability of the positive electrode active material is, and the smaller the leakage current value is, the higher the surface stability of the positive electrode active material is. That is, it may be understood that the surface stabilities of Examples 1 and 2 were better than those of Comparative Examples 1 to 4.

The invention claimed is:

1. A method of preparing a positive electrode active material, the method comprising:
   preparing a lithium transition metal oxide containing nickel in an amount of 60 mol % or more based on a total number of moles of metals excluding lithium;
   impregnating the lithium transition metal oxide with 300 ppm to 1,000 ppm of moisture based on 100 parts by weight of the lithium transition metal oxide; and
   performing a heat treatment on the lithium transition metal oxide impregnated with the moisture,
   wherein a lithium by-product present on a surface of the lithium transition metal oxide and the moisture react to form a passivation layer, having a rock-salt structure, on the surface of the lithium transition metal oxide.

2. The method of claim 1, wherein the lithium transition metal oxide is impregnated with 300 ppm to 500 ppm of moisture based on 100 parts by weight of the lithium transition metal oxide.

3. The method of claim 1, wherein the passivation layer comprises lithium carbonate.

4. The method of claim 1, wherein the lithium transition metal oxide is represented by Formula 1:

$$Li_{1+a}[Ni_{1-x-y-w}Co_xM^1_yM^2_w]_{1-a}O_2 \qquad \text{[Formula 1]}$$

wherein, in Formula 1,

M$^1$ comprises at least one of manganese (Mn) or aluminum (Al), $M^2$ comprises at least one of barium (Ba), calcium (Ca), zirconium (Zr), titanium (Ti), magnesium (Mg), tantalum (Ta), niobium (Nb), or molybdenum (Mo), and $0 \leq a \leq 0.5$, $0 \leq x \leq 0.4$, $0 \leq y \leq 0.4$, and $0 \leq w \leq 0.1$.

5. The method of claim 1, wherein the lithium by-product present on the surface of the lithium transition metal oxide comprises at least one of $Li_2O$, $LiOH$, or $Li_2CO_3$.

6. The method of claim 1, wherein the heat treatment is performed in a temperature range of 500° C. to 900° C. for 3 hours to 15 hours.

7. The method of claim 1, wherein the passivation layer is changed from a layered structure to the rock salt structure by the heat treatment.

8. A positive electrode active material comprising:
a lithium transition metal oxide containing nickel in an amount of 60 mol % or more based on a total number of moles of metals excluding lithium; and
a passivation layer which is disposed on a surface of the lithium transition metal oxide, has a rock salt structure, and includes lithium carbonate,
wherein the moisture content of the positive electrode active material is below 250 ppm based on 100 parts by weight of the lithium transition metal oxide.

9. The positive electrode active material of claim 8, wherein the passivation layer has a thickness of 5 nm to 30 nm.

10. The positive electrode active material of claim 8, wherein the passivation layer is formed by reacting a lithium by-product present on the surface of the lithium transition metal oxide and moisture impregnated in the surface of the lithium transition metal oxide.

11. A positive electrode for a lithium secondary battery, the positive electrode comprising the positive electrode active material of claim 8.

12. A lithium secondary battery comprising the positive electrode of claim 11.

* * * * *